US012637042B2

(12) United States Patent (10) Patent No.: US 12,637,042 B2
Förster (45) Date of Patent: May 26, 2026

(54) METHOD OF OPERATING THE PARKING BRAKE OF A MOTOR VEHICLE BASED ON THE FRICTION VALUES OF EACH WHEELS

(71) Applicant: AUDI AG, Ingolstadt (DE)

(72) Inventor: Kilian Förster, Beilngries (DE)

(73) Assignee: AUDI AG, Ingolstadt (DE)

( * ) Notice: Subject to any disclaimer, the term of this patent is extended or adjusted under 35 U.S.C. 154(b) by 106 days.

(21) Appl. No.: 18/458,465

(22) Filed: Aug. 30, 2023

(65) Prior Publication Data

US 2024/0116481 A1 Apr. 11, 2024

(30) Foreign Application Priority Data

Oct. 6, 2022 (DE) .......................... 102022125801.7

(51) Int. Cl.
*B60T 8/17* (2006.01)

(52) U.S. Cl.
CPC ......... *B60T 8/1706* (2013.01); *B60T 2210/12* (2013.01)

(58) Field of Classification Search
CPC .... B60T 8/1706; B60T 2210/12; B60T 7/122; B60T 13/741; B60T 2201/06; B60T 8/172; B60T 8/1763; B60T 8/245; B60T 8/171; B60T 2210/20; B60W 10/182; B60W 10/184; B60Y 2400/81
See application file for complete search history.

(56) References Cited

U.S. PATENT DOCUMENTS

| | | | | |
|---|---|---|---|---|
| 6,312,065 B1 * | 11/2001 | Freitag | ................... | B60T 7/122 |
| | | | | 303/186 |
| 6,428,120 B1 | 8/2002 | Holl | | |
| 2002/0011093 A1 | 1/2002 | Matsuno | | |
| 2006/0108865 A1 * | 5/2006 | Sauter | ................... | B60T 8/1764 |
| | | | | 303/148 |
| 2010/0004095 A1 * | 1/2010 | Sokoll | ................... | B60T 7/122 |
| | | | | 477/198 |
| 2013/0207453 A1 * | 8/2013 | Knechtges | ............ | B60T 8/1764 |
| | | | | 303/189 |
| 2014/0244128 A1 * | 8/2014 | Watanabe | ............. | B60T 8/1755 |
| | | | | 701/74 |
| 2015/0239445 A1 | 8/2015 | Inoue et al. | | |
| 2017/0057361 A1 * | 3/2017 | Cho | ...................... | B60W 10/08 |
| 2017/0305403 A1 | 10/2017 | Maron et al. | | |
| 2017/0349154 A1 * | 12/2017 | Ryu | ....................... | B60T 8/172 |

(Continued)

FOREIGN PATENT DOCUMENTS

| | | | |
|---|---|---|---|
| DE | 102005045998 A1 | 5/2006 |
| DE | 102006026626 A1 | 12/2007 |

(Continued)

OTHER PUBLICATIONS

Office Action issued on Dec. 4, 2024, in corresponding Korean Application No. 10-2023-0123837, 10 pages.

(Continued)

*Primary Examiner* — Sze-Hon Kong
(74) *Attorney, Agent, or Firm* — Maier & Maier, PLLC

(57) ABSTRACT
A method for operating a motor vehicle having two wheels, each of which is associated with a parking brake. The parking brakes are controlled as a function of a friction between the respective wheel and the ground.

18 Claims, 1 Drawing Sheet

(56) References Cited

U.S. PATENT DOCUMENTS

| | | | | |
|---|---|---|---|---|
| 2018/0118177 A1* | 5/2018 | No | ............................... | H02P 7/03 |
| 2018/0215355 A1* | 8/2018 | Kinder | ....................... | B60T 7/12 |
| 2018/0244248 A1* | 8/2018 | Ryu | ....................... | B60T 13/741 |
| 2019/0331221 A1* | 10/2019 | Shirakawa | .............. | B60T 11/10 |
| 2020/0247382 A1* | 8/2020 | Chang | ................... | B60Q 9/002 |
| 2020/0317181 A1* | 10/2020 | Sun | ........................... | B60T 7/12 |
| 2020/0353907 A1* | 11/2020 | Wolff | ....................... | B60T 17/22 |
| 2020/0361432 A1* | 11/2020 | Hawley | ..................... | B60T 8/32 |
| 2021/0122341 A1* | 4/2021 | Okumura | .................. | B60T 8/72 |
| 2021/0188284 A1* | 6/2021 | Hassel | .................. | B60W 10/20 |
| 2021/0300332 A1* | 9/2021 | Kasuya | ................ | B60W 40/114 |
| 2022/0048514 A1* | 2/2022 | Stenneth | ............... | B60W 50/14 |
| 2022/0055623 A1* | 2/2022 | Chae | ....................... | B60T 8/172 |
| 2022/0289234 A1* | 9/2022 | Zhang | ................... | B60W 40/10 |
| 2023/0192044 A1* | 6/2023 | Marx | ................... | B60T 8/17551 |
| | | | | 701/70 |
| 2023/0365109 A1* | 11/2023 | Kim | ........................ | B60T 8/171 |
| 2024/0043012 A1* | 2/2024 | Abe | ........................ | G06F 30/15 |
| 2024/0051506 A1* | 2/2024 | Nam | ....................... | F16D 66/00 |
| 2024/0053273 A1* | 2/2024 | King | ........................ | G01P 3/50 |
| 2024/0101089 A1* | 3/2024 | Kim | ........................ | B60T 13/58 |
| 2025/0170998 A1* | 5/2025 | Wang | ..................... | B60T 8/172 |

FOREIGN PATENT DOCUMENTS

| | | |
|---|---|---|
| DE | 102006040740 A1 | 3/2008 |
| DE | 102015226841 A1 | 7/2017 |
| DE | 19950028 B4 | 4/2018 |
| DE | 102015007365 B4 | 9/2020 |
| EP | 1678018 B1 | 11/2007 |
| JP | H11222055 A | 8/1999 |
| JP | 2007203861 A | 8/2007 |
| JP | 4993050 B2 | 8/2012 |
| JP | 2015160478 A | 9/2015 |

OTHER PUBLICATIONS

Search Report issued on Jul. 4, 2023, in corresponding German Application No. 102022125801.7, 8 pages.
Extended European Search Report issued on Feb. 19, 2024, in corresponding European Application No. 23195869.5, 16 pages.

* cited by examiner

METHOD OF OPERATING THE PARKING BRAKE OF A MOTOR VEHICLE BASED ON THE FRICTION VALUES OF EACH WHEELS

FIELD

The invention relates to a method for operating a motor vehicle and to a motor vehicle.

BACKGROUND

Motor vehicles, such as passenger cars, usually have a parking brake by means of which the motor vehicle, if parked, is secured against unintentional movement. Increasingly, such parking brakes are electric and are activated, for example, when the vehicle is locked from the outside or when an operating mode is switched. The parking brake usually has a brake disc that is non-rotatably connected to an associated wheel. Furthermore, the parking brake has one or more brake pads which are retained on the body side and which fix the brake disc in the activated state.

The parking brake is not used to decelerate the vehicle, whereby the forces applied are comparatively low. For this reason, the components of the parking brake are usually comparatively slim, which reduces costs and weight. Usually, two different wheels of the motor vehicle are each associated with such a parking brake, so that redundancy is given.

During operation, it is possible that due to environmental conditions, such as increased humidity, a coefficient of friction between the brake disc and the brake pads of each parking brake is reduced. Since however, the force required to prevent movement of the motor vehicle is distributed between the two parking brakes, movement of the motor vehicle is still prevented. However, if one of the wheels to which one of the parking brakes is associated with rests on a comparatively slippery surface, the force required to prevent the motor vehicle from moving can only be applied by means of the other parking brake, which is then insufficient.

To avoid this, for example, the brake pads are always applied against the respective brake disc with maximum force, which leads to increased wear. Thus, a comparatively robust design is required, although in most applications the applied forces are not needed to secure the motor vehicle.

SUMMARY

The object of the invention is to specify a particularly suitable method for operating a motor vehicle as well as a particularly suitable motor vehicle, wherein advantageously safety is increased and/or manufacturing costs are reduced.

The method serves to operate a motor vehicle. The motor vehicle is land based and preferably movable independently of rails or the like and thus not rail-guided. The motor vehicle comprises at least two wheels by means of which contact is made with the ground, in particular a driving lane. Expediently, each wheel has a rim which is surrounded by a tire of the wheel. In particular, the tire is made of rubber or caoutchouc. Expediently, the motor vehicle comprises exactly four such wheels. The motor vehicle is expediently a commercial motor vehicle, such as a commercial vehicle (truck) or a bus. Particularly preferably, however, the motor vehicle is a passenger motor vehicle (passenger car).

The motor vehicle expediently comprises a drive, which comprises, for example, an internal combustion engine, an electric motor or a combination thereof. Here, the drive is expediently in operative connection with at least one of the wheels. Particularly preferably, the motor vehicle has a steering system which is operatively connected to at least one of the wheels. In particular, it is possible to set a direction of movement of the motor vehicle by actuating the steering system. When the steering system is actuated, the wheels that are operatively connected to the steering system are suitably pivoted with respect to a body, if present, of the motor vehicle.

Furthermore, the motor vehicle comprises at least two parking brakes associated with the different wheels. In other words, one of the parking brakes is associated with each of the two wheels. Insofar as the motor vehicle has, for example, a plurality of wheels, one such parking brake is associated with each of the wheels, for example, and the number of parking brakes corresponds to the number of wheels. Particularly preferably, however, only two parking brakes are present even in the case of several wheels.

The parking brakes serve to hold the respectively associated wheel in the respective position, so that rotation of the respectively associated wheel is prevented by means of the parking brakes. In particular, each parking brake has a first component that is connected to the respectively associated wheel in a rotationally fixed manner, for example directly or preferably via further components. Thus, when the respective wheel rotates, the first component rotates with the respective wheel. Furthermore, each parking brake comprises a second component, which is expediently held on the body side. By means of the second component, it is possible in this case to hold the first component in a position and thus to prevent rotation of the first component and therefore also the respectively associated wheel with respect to the body. To prevent rotation, the two components interact with each other in particular only frictionally, but not positively. In other words, there is in particular no latching or the like. Expediently, each parking brake is designed as a disc brake or drum brake.

The method provides that the parking brakes are controlled in dependence on a friction between the respective wheel and the ground. In particular, the method is carried out when the motor vehicle is stopped, in particular parked. In other words, the parking brakes are only activated in a manner that rotation of the respective wheel is prevented or at least made more difficult by means of these brakes if the motor vehicle is not to be moved and in particular the motor vehicle is to be parked safely. For example, the parking brakes are activated, i.e. controlled, when the motor vehicle is locked from the outside or when a certain operating mode is activated, in which, for example, the drive, if present, is decoupled from the associated wheels.

In summary, the method thus in particular first determines the friction between each of the wheels with which one of the parking brakes is associated and the respective ground on which the respective wheel is resting. Here, for example, the static friction is determined directly or at least through a value corresponding thereto. In particular, a coefficient of friction is used for this purpose, or at least a value that is functionally related to the coefficient of friction. Alternatively, or in combination with this, an actual weight of the motor vehicle is taken into account when determining the friction.

Since the mechanical properties of the respective wheel are essentially constant, the parking brakes are thus controlled in particular as a function of the condition of the respective surface and/or a weight of the motor vehicle. Thus, in particular, the nature of the ground is taken into account, and whether it is a relatively grippy or slippery ground. Thus it is possible to control the parking brakes even on a comparatively slippery surface in such a way that unintentional movement of the vehicle after parking is prevented, so that safety is increased. On the other hand, a comparatively gentle actuation of the parking brakes is preferably selected for a comparatively grippy surface, so that excessive wear is reduced. This makes it possible to use comparatively inexpensive materials for the parking brakes and to simplify the design of the parking brakes so that manufacturing costs are reduced.

For example, both parking brakes are controlled in the same way. Particularly preferably, however, each parking brake is controlled depending on the friction between the respective wheel and the ground. In other words, it is possible for the control of the two parking brakes to differ from one another. Thus, a load on the parking brakes is further reduced, while still ensuring a safe stop of the motor vehicle after it has been parked.

For example, the control of the parking brakes is continuously adjusted as a function of the respective friction, so that the control is continuously adjusted. Alternatively, there are, for example, only two different types of control, and if the friction falls below a certain value, for example, one of these types is used and otherwise the other. In a further embodiment, several such stages of control are present.

For example, control of the parking brakes as a function of friction is always performed or only performed when certain environmental conditions are present. In such environmental conditions, in particular, an interaction between the possible components of the respective parking brake is reduced. Such environmental conditions are, for example, increased air humidity and/or low temperature. In this case, in particular if the parking brakes are designed as disc brakes, an adhesive friction between the two components is reduced, so that the forces acting between the components are reduced with unchanged control. Since the control of the parking brakes as a function of friction only takes place in such cases in which, for example, the force applied by means of one of the parking brakes is not sufficient for safe stopping, when the friction between the ground and the associated wheel is additionally reduced, an effort is reduced while nevertheless always allowing safe stopping of the motor vehicle in the respective parked position.

Particularly preferably, according to the method, the clamping force of that parking brake is increased which is associated with that wheel at which the higher friction is present. In other words, it is determined at which of the wheels the higher friction is present, i.e. at which the contact with the ground is comparatively pronounced. In the case of the parking brake associated with this wheel, the clamping force is increased so that, in particular, a force acting between the two components, if present, is increased. In this way, a load on these components of the parking brake is increased. However, this parking brake is primarily used to prevent movement of the motor vehicle so that the motor vehicle is held safely in the current position.

For example, in the remaining parking brake, the clamping force is also increased so that the holding of the motor vehicle in the current position is supported by means of this parking brake. Preferably, however, the clamping force of this parking brake is left constant, i.e. not increased, or reduced, so that a load on this parking brake is reduced. Since, due to the reduced friction between the wheel associated with this parking brake and the ground, the holding of the motor vehicle is only slightly supported, an increase in the clamping force only has a minor effect on the holding of the motor vehicle, whereas the wear, however, is comparatively high. Due to the possible reduction of the clamping force, wear of this parking brake is thus reduced.

To increase the clamping force, in particular the force with which the two components, if any, bear against each other is increased. For example, a brake pressure in a hydraulic system of the respective parking brakes is increased. For example, a pressure of about 20 bar is increased to a value above 22 bar, while the pressure is expediently left lower than 90 bar, 70 bar or 60 bar. In particular, the brake pressure is increased to 25 bar. Preferably, the brake pressure is increased by between 10% and 80% or between 15% and 50% and, for example, by 25%. If the parking brake is designed as an electric parking brake, in particular a cut-off current is increased, for example by between 10% or 80% or by between 15% and 50% and in particular by 25%. Due to such values, the clamping force is increased, yet an overload of the parking brakes is substantially excluded.

For example, the clamping force is always increased if there is increased friction on one of the wheels. Since the motor vehicle is parked in different ways on different grounds, the wheel where the higher friction prevails is not always the same, so that the increase in the clamping force is distributed between the different parking brakes over time. Thus, overloading of one of the parking brakes is reduced, which would lead to premature failure of that parking brake. Particularly preferably, however, the clamping force is increased only if the two frictions differ by more than 20%. If the two frictions differ by less than 20%, the clamping force is not increased. Thus, the clamping force is increased only in exceptional situations, so that overloading of the parking brakes is further reduced. Preferably, the clamping force is only increased if the two frictions differ by more than 40%, 50%, 60% or 80%, wherein this is always considered in particular based on the smaller of the frictions, the larger of the frictions or the mean value of the frictions. In particular, to determine whether the clamping force is increased, the frictions determined are set in relation to each other.

In particular, if at least one of the frictions is lower than a certain limit value, a warning is output for a driver of the motor vehicle, by means of which the driver is made aware of the comparatively low friction. By means of the warning, the driver is in particular requested to park the motor vehicle at another location where a higher friction is present.

For example, the respective friction is only determined when the motor vehicle is at a standstill. Particularly preferably, however, the respective friction is determined at least partially while the associated wheel is still rotating, i.e. in particular when the motor vehicle is still being moved. Preferably, the method is started when the speed of the motor vehicle falls below a certain threshold value, such as 5 km/h. In summary, the friction between the respective wheel and the ground is already determined before the motor vehicle comes to a complete stop. In this way, it is possible to determine the friction using several sensors, which increases the accuracy of the friction determination.

For example, to determine the friction, the possible drive of the motor vehicle is controlled accordingly so that the wheel is rotated at least briefly. In particular, the wheel is driven in such a way that wheel slip is present, on the basis of which the friction is determined. This is also possible, for example, when the motor vehicle is stationary, if movement of the motor vehicle is prevented, for example, by means of the additional parking brakes. Alternatively, or in combination with this, this already takes place while the motor vehicle is moving, when the drive is actuated by the driver, for example, or the actuation of the drive takes place on the basis of the method, whereby essentially no speed reduction of the motor vehicle takes place. In particular, the control of the drive takes place in such a way that this is not noticeable to the driver of the motor vehicle. Thus, comfort is increased.

Particularly preferably, the respective friction is determined on the basis of a braking of the associated wheel. In particular, an existing braking system of the motor vehicle is read out for this purpose, wherein this braking system is used in particular to brake the motor vehicle, i.e. the wheels. However, the parking brakes in particular are not associated with this braking system, or at least they are not used for this purpose. For example, the braking system comprises several disc brakes. Alternatively or in combination, the braking is performed by means of an electric motor or generator, and in particular recuperation is performed.

For example, in order to determine the friction by means of the braking system or of the drive of each of the wheels, braking is performed in a different manner, so that the friction is determined on the basis of the resulting slip and/or speed. In particular, the wheels are braked alternately, and the respective friction is determined on the basis of the different reactions. The distribution of the braking force is conveniently such that the sum is always constant, but the components associated with the individual wheels are different or variable, so that the driver of the motor vehicle cannot perceive the different actuation of brakes of the braking system. Thus, the driver is not distracted and comfort is increased.

Alternatively, or in combination therewith, the respective friction is determined at least in part on the basis of a steering angle of the associated wheel. In other words, an orientation of the respective wheel with respect to a body of the motor vehicle is determined and the friction is at least partially derived therefrom. For example, at least one of the two wheels with which one of the parking brakes is associated is designed to be steerable, so that the steering angle can be changed as a wheel angle. Preferably, both wheels are designed to be steerable, whereby in particular their camber differs. When the steering angle is changed, the contact area of the respective wheel on the ground is changed, so that this results in different frictions, even if the nature of the ground is essentially the same. The steering angle is determined in particular by reading a steering system, by means of which in particular the steering angle of at least one of the wheels is adjusted.

Alternatively, or in combination therewith, the friction is determined at least in part by means of an environmental parameter. Preferably, several such environmental parameters are used. For example, the environmental parameter is valid for only one of the wheels with which one of the parking brakes is associated, or for both wheels. For example, such an environmental parameter is an outside temperature or tire temperature, the presence of a construction site and resulting construction materials or contaminants, such as sand, on the ground, a slope of the ground, and/or the weather or parameters at least functionally related to any of these. For example, the environmental parameter is a presence of ice, snow, or rain and/or the respective strength thereof, as the case may be. At least the environmental parameter is in particular such that by means of it the ground condition or at least the adhesion of the wheel to the ground is influenced or at least described.

For example, the environmental parameter is received by means of radio. For this purpose, the motor vehicle expediently has a radio system by means of which the environmental parameter is received. In particular, the radio system is used to retrieve the environmental parameter from a server or the like in which the environmental parameter is stored. For example, the environmental parameter is valid only for the current position of the motor vehicle, and to determine the environmental parameter, the current position of the motor vehicle is preferably determined first, for example by means of a GPS system. The radio system suitably complies with a certain standard, such as a WLAN standard or a mobile radio standard, and is operated accordingly.

Alternatively or in combination, at least one of the environmental parameters is determined by means of a sensor of the motor vehicle. Preferably, a camera is used for this purpose, which is directed in particular at the ground. The camera preferably detects the ground below or in front of the motor vehicle and uses this to determine the environmental parameter and the friction. For example, the camera is only provided for carrying out the method. Particularly preferably, however, the camera is also associated with a further assistance system, for example a lane departure warning system, so that manufacturing costs are reduced. By means of the camera, comparatively accurate detection of the ground and/or the environmental parameter is possible, so that the friction can be determined comparatively accurately using the camera.

The motor vehicle is, for example, a commercial vehicle (truck, bus) or a passenger car. The motor vehicle is land-based and has at least two, i.e. two or more, wheels by means of which contact is made with the ground. The wheels expediently each comprise a tire, which is made of a rubber, for example. By means of the respective tire in particular the mechanical contact to the ground takes place. Each tire itself is expediently mounted on an associated rim of the respective wheel and preferably surrounds it. The rim stabilizes the respective tire. Suitably, the motor vehicle comprises a drive and/or steering system coupled to at least some of the wheels.

The motor vehicle further comprises two parking brakes, the parking brakes being associated with different wheels. Here, it is possible to use each of the parking brakes to prevent movement of the respective associated wheel. For example, the two parking brakes are identical in construction, which reduces costs. Alternatively, they are different. Preferably, the parking brakes each comprise a first component that is rotationally fixedly connected to the respective associated wheel, so that the latter is also rotated when the motor vehicle moves forward and the wheel rotates as a result. Furthermore, each of the parking brakes further expediently comprises a second component which is held on the body side and by means of which it is possible to influence the first component so that a force is exerted on the latter as a result of which rotation of the first component and thus of the wheel is prevented. For example, one or both parking brakes are designed as disc brakes, where the first component is or at least comprises a brake disc and the second component is or comprises a brake pad. Alternatively, for example, at least one of the parking brakes is designed as a drum brake.

The motor vehicle is operated according to a method for operating a motor vehicle. According to the method, the parking brakes are controlled as a function of a friction between the respective wheel and the ground. The motor vehicle expediently comprises a control unit which is provided and arranged to perform the method. The control unit is, for example, a component of an assistance system and or an on-board computer, or the control unit is a separate component. The control device comprises, for example, an application specific circuit (ASIC) which is used to perform the method. Alternatively, or in combination therewith, the control unit comprises a microprocessor, which in particular is designed to be programmable. In particular, the microprocessor forms a computer, and the method is suitably stored in a computer program product which can be executed by means of the computer. The invention relates in particular to such a control device.

The computer program product, also referred to as a computer program or merely a program, comprises a number of instructions which, when the program is executed by a computer, cause the computer to perform a method for operating a motor vehicle having two wheels, each of which has a parking brake associated therewith. According to the method, the parking brakes are controlled in dependence on a friction between the respective wheel and the ground. The computer is expediently a component of a control unit or electronics and is formed, for example, by means thereof. The computer preferably comprises a microprocessor or is formed by means thereof. The computer program product is, for example, a file or a data carrier containing an executable program which, when installed on a computer, automatically executes the method.

The invention further relates to a storage medium on which the computer program is stored. Such a storage medium is, for example, a CD-ROM, a DVD or a Blu-Ray disc. Alternatively, the storage medium is a USB stick or other memory which is, for example, rewritable or writable only once. Such a memory is for example a flash memory, a RAM or a ROM.

The developments and advantages explained in connection with the method are also to be applied mutatis mutandis to the motor vehicle/control unit/computer program product/ storage medium and among each other, and vice versa.

BRIEF DESCRIPTION OF THE FIGURES

In the following, an exemplary embodiment of the invention is explained in more detail by means of a drawing. In particular.

Corresponding parts are marked with the same reference signs in all figures.

DETAILED DESCRIPTION

Figure 1:
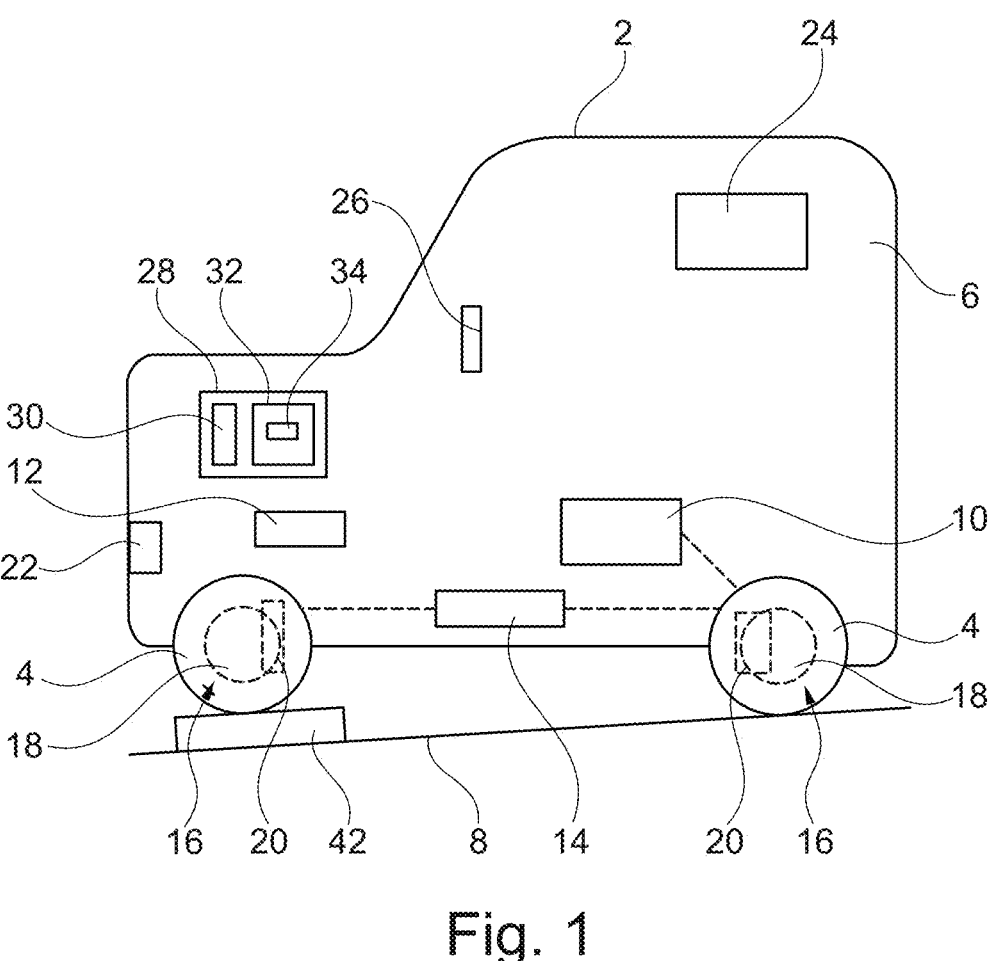
FIG. 1 shows a motor vehicle with two parking brakes.

FIG. 1 shows in a schematic simplified view a motor vehicle 2 in the form of a passenger car. The motor vehicle 2 has a total of four wheels 4, of which only two are shown here. The wheels 4 are attached to a body 6 of the motor vehicle 2 by means of a chassis not shown in greater detail. The wheels 4, each comprising a tire and a rim, rest on a ground 8 and thus serve to establish contact between the motor vehicle 2 and the ground 8.

The motor vehicle 2 comprises a drive 10 which is operatively connected to at least one of the wheels 4. In this embodiment, the drive 10 comprises only one or more electric motors, so that the motor vehicle 2 is designed as an electric vehicle. In addition, the motor vehicle 2 comprises a steering system 12, by means of which a steering angle of at least one of the wheels 4 with respect to the body 6 can be changed, so that a direction of travel of the motor vehicle 2 is changed. Also, the motor vehicle 2 comprises a braking system 14, which comprises four disc brakes not shown in more detail. By means of the braking system 14, it is possible to brake a rotation of the wheels 4 and thus to bring the motor vehicle 2 to a standstill.

Furthermore, the motor vehicle 2 has a total of two parking brakes 16, which are separate from the braking system 14. The two parking brakes 16 are identical in construction to each other but are associated with different ones of the wheels 4. Each of the parking brakes 16 has a first component 18 in the form of a brake disc, which is non-rotatably connected to the associated wheel 4. Thus, when the respective wheel 4 rotates, the respective first component 18 also rotates. In addition, each parking brake 16 has a second component 20 which comprises a plurality of brake pads not shown in greater detail. When the respective parking brake 16 is actuated, the second component 20 is pressed against the first component 18 so that a frictional connection is created between them. In other words, the brake pads are brought against the brake disc, thus preventing rotation of the brake disc. The parking brakes 16 have an electric motor, not shown in more detail, by means of which the brake pads are driven at least indirectly, so that the parking brakes 16 are electric parking brakes. The design of the parking brakes 16 is such that they essentially enable the motor vehicle 2 to be held in a fixed position. Braking of the motor vehicle 2 during movement, on the other hand, should not or cannot be performed by means of the parking brakes 16, and the braking system 14 is used for this purpose.

The motor vehicle 2 comprises a plurality of cameras 22, only one of which is shown. By means of the cameras 22, the environment of the motor vehicle 2 is optically detected, in particular also the ground 8. The cameras 22 are thereby associated with a lane departure warning system, by means of which lane markings are detected when the motor vehicle 2 is moving and the position of the motor vehicle 2 with respect to the lane markings is determined.

In addition, the motor vehicle 2 has a radio system 24 that complies with a mobile radio standard. By means of the radio system 24, it is possible to establish a radio connection to a server, which is not shown in more detail, and to exchange data therewith. The motor vehicle 2 also has an output device 26 which is arranged in an interior of the motor vehicle 2 which is surrounded by the body 6. The output device 26 is a display screen.

Figure 2:
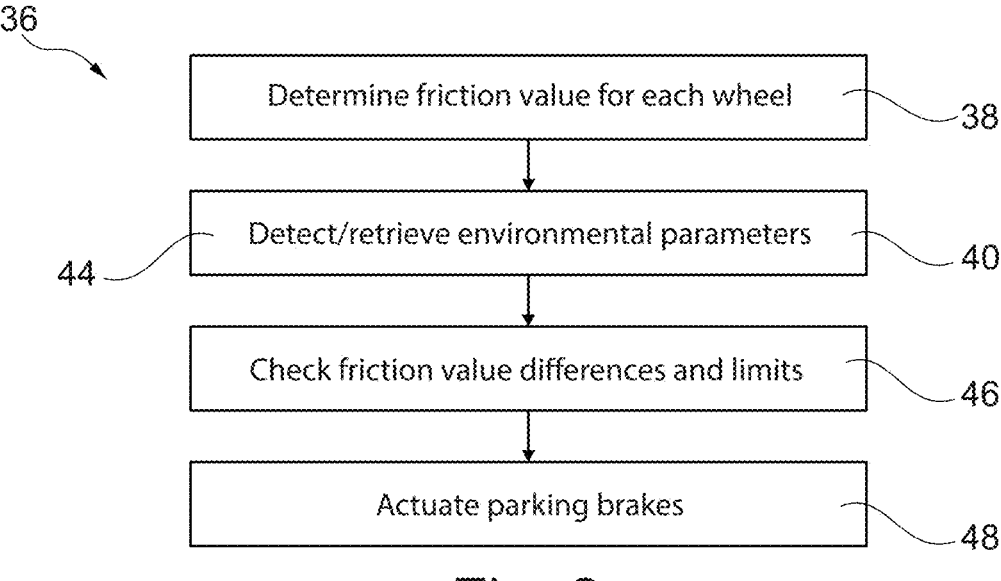
FIG. 2 shows a method for operating the motor vehicle.

Also, the motor vehicle 2 comprises a control device 28 comprising a computer 30 in the form of a programmable microprocessor. Further, the control unit 28 comprises a memory unit in the form of a memory 32 on which a computer program product 34 is stored. The computer program product 34 includes a plurality of instructions which, when executed by the computer 30, cause the computer to perform a method 36 for operating a motor vehicle 2 as shown in FIG. 2. In other words, the control unit 28 is provided and arranged to perform the method 36, and the motor vehicle 2 is operated in accordance with the method 36.

The method 36 is started when a speed of the motor vehicle 2 falls below 5 km/h. In this case, a first operation step 38 is performed. In this, the braking system 14 is read out and, based on this, a value of a friction between each of the wheels 4, each of which is associated with one of the parking brakes 16, and the ground 8 is at least preliminarily determined. Also, a braking action is changed by means of the braking system 14, so that one of the wheels 4 is braked at least temporarily more strongly than the other wheel, wherein the total braking force applied remains constant or the same. This is performed alternately for the two wheels 4, and based on the different reactions of the wheels 4, the friction between the respective wheel 4 and the ground 8 is further adjusted. In other words, the friction between each of the wheels 4 and the ground 8 is determined based on the deceleration of the associated wheel 4 while it is still rotating, namely while the motor vehicle 2 is moving.

In addition, the drive 10 is briefly actuated so that the wheels 4 which are operatively connected thereto are accelerated, wherein an acceleration of the motor vehicle 2 itself is prevented by means of a suitable control of the braking system 14. Also on the basis of the resulting rotation of the wheels 4, the friction between the respective wheel 4 and the ground 8 is determined.

When the motor vehicle 2 is at a complete standstill, a second step 40 is performed. In this step, the ground 8 is optically detected by means of the cameras 22. In the example shown, an ice plate 42 is thus detected on which one of the wheels 4, with which one of the parking brakes 16 is associated, is standing. The ice plate 42 is here an environmental parameter 44, which is thus detected in the second step 40. If there were sand or gravel on the ground 8, for example, this would be used as the respective environmental parameter 44. In particular, these environmental parameters 44 only concern one of the wheels 4.

In addition, further environmental parameters 44 are retrieved from a server by means of the radio system 24, which are thus received by means of radio. These environmental parameters 44 concern an air humidity as well as a temperature. Thus, in this embodiment, these environmental parameters 44 apply to all wheels 4. Based on the environmental parameters 44, the already determined frictions are further adjusted, so that the frictions are also determined at least partially based on the environmental parameters 44. Due to the ice plate 42, one of them is reduced, wherein due to an incipient or impending rain, which was detected by means of the radio system 24, this tends towards 0 ("zero").

Also, in order to determine the friction, a steering angle of the wheels 4 is taken into account. For this purpose, the setting of the wheels 4 is retrieved, which was caused by means of the steering system 12. Depending on the steering angle of the wheels 4, the respective camber results in a different contact surface on the ground 8, so that the friction is at least partially determined by the steering angle of the respective wheel 4.

In a subsequent third step 46, it is checked whether the determined friction between the wheels 4 and the ground 8 differs by more than 20%. It is also checked whether the friction between all wheels 4 and the ground 8 falls below a certain fixed limit value. If this is the case or will change in the near future due to environmental conditions 44 detected by means of the radio system 24, a warning is issued via the output device 26. Thus, it is possible for a driver of the motor vehicle 2 to park it at another location where higher friction is present.

If this is not done, and the driver, for example, leaves the motor vehicle 2 and locks it from the outside, a fourth step 48 is carried out. In this step, the two parking brakes 16 are actuated and thus controlled. In this case, the clamping force of that parking brake 16 is increased which is associated with that wheel 4 at which the higher friction is present. For this purpose, 25 A is selected for a cut-off current, up to which the electric motor by means of which the brake pads are actuated is operated, whereas the clamping force is not changed for the remaining parking brake 16 and 20 A continues to be used as cut-off current. By means of the wheel 4 with which the associated parking brake 16 is actuated with the increased clamping force, an increased holding force of the motor vehicle 2 is exerted on the ground 8, so that the holding force reduced due to the reduced friction between the other wheel 4, with which the remaining parking brake 16 is associated, and the ground 8 is at least partially compensated. Thus, even in adverse conditions, holding of the motor vehicle 2 on the ground 8 is possible.

If the determined frictions are greater than a predetermined limit value and do not differ by more than 20%, the control of the parking brakes 16 is always identical, regardless of the friction actually present. In this case, the cut-off current is always 20 A. Thus, excessive wear of the parking brakes 16 is reduced, while in unfavorable situations a safe holding of the motor vehicle 2 in the desired position is nevertheless ensured.

The invention is not limited to the exemplary embodiment described above. Rather, other variants of the invention may also be derived therefrom by the person skilled in the art without departing from the subject matter of the invention. In particular, all the individual features described in connection with the exemplary embodiment can also be combined with one another in other ways without departing from the object of the invention.

LIST OF REFERENCE NUMERALS 2 motor vehicle
4 wheel
6 body
8 ground
10 drive
12 steering system
14 braking system
16 parking brake
18 first component
20 second component
22 camera
24 radio system
26 output device
28 control unit
30 computer
32 memory
34 computer program product
36 method
38 first operation step
40 second operation step
42 ice plate
44 environmental parameters
46 third operation step
48 fourth operation step

The invention claimed is:

1. A method comprising:
    determining, in a motor vehicle comprising two wheels, a first friction value associated with a first wheel;
    determining, in the motor vehicle comprising the two wheels, a second friction value associated with a second wheel, wherein each wheel is associated with a parking brake and determining the first friction value and determining the second friction value is performed alternately;
    comparing the first friction value and the second friction value to determine a difference between the first friction value and the second friction value; and
    actuating each parking brake based upon the comparison of the first friction value and the second friction value, wherein the actuation includes at least control as a function of the difference between the first friction value and the second friction value and control as a function of a weight of the motor vehicle.

2. The method according to claim 1, further comprising:

increasing a clamping force of a respective parking brake associated with a wheel associated with a higher friction value based upon the difference between the first friction value and the second friction value.

3. The method according to claim 2, further comprising:

increasing the clamping force only after the difference between the first friction value and the second friction value is greater than 20%.

4. The method according to claim 2, wherein increasing the clamping force further comprises:

increasing a brake pressure in a hydraulic system from substantially 20 bar to substantially 25 bar.

5. The method according to claim 2, wherein increasing the clamping force further comprises:

increasing brake pressure in a range between 10% and 80%.

6. The method according to claim 5, further comprising:

increasing the brake pressure in a range between 15% and 50%.

7. The method according to claim 6, further comprising:

increasing the brake pressure by substantially 25%.

8. The method according to claim 1, further comprising:

determining the first friction value and the second friction value during rotation of each associated wheel.

9. The method according to claim 8, further comprising:

determining the first friction value and the second friction value based upon braking of each associated wheel.

10. The method according to claim 1, further comprising:

determining the first friction value and the second friction value based upon a steering angle of each associated wheel.

11. The method according to claim 1, further comprising:

determining the first friction value and the second friction value based upon an environmental parameter.

12. The method according to claim 11, further comprising:

retrieving the environmental parameter with a radio system from a server.

13. The method according to claim 11, further comprising:

optically detecting the environmental parameter with a camera.

14. The method of claim 13, wherein optically detecting the environmental parameter with the camera further comprises:

optically detecting an ice plate.

15. The method of claim 1, wherein the at least two types of control comprise continuous adjustment of control of each parking brake.

16. The method of claim 1, wherein the at least two types of control comprise only two different types of control.

17. The method of claim 16, wherein control of both parking brakes is identical when each friction value exceeds a first threshold and the difference between the first friction value and the second friction value is less than a second threshold.

18. The method of claim 1, further comprising:

comparing each friction value to a first threshold; and issuing a warning after each friction value is below the first threshold.

* * * * *